United States Patent [19]

Misek

[11] 4,210,400
[45] Jul. 1, 1980

[54] NON-SEGMENTED PHASE GRADIENT DETECTOR FOR COAT SYSTEM

[75] Inventor: Victor A. Misek, Hudson, N.H.

[73] Assignee: Sanders Associates, Inc., Nashua, N.H.

[21] Appl. No.: 940,794

[22] Filed: Sep. 7, 1978

[51] Int. Cl.$^2$ .............................................. G01B 9/02
[52] U.S. Cl. .................................... 356/359; 356/361
[58] Field of Search ............... 356/343, 348, 359, 360, 356/361

[56] References Cited

U.S. PATENT DOCUMENTS 3,950,103  4/1976  Schmidt-Weinmar .......... 356/359 X

OTHER PUBLICATIONS

Pearson "Compensation of Propagation Distortions Using Coherent Optical Adaptive Techniques (COAT)", Optical Engineering, vol. 15, No. 2, pp. 151-157, Mar.-Apr. 1976.

Primary Examiner—John K. Corbin
Assistant Examiner—Matthew W. Koren
Attorney, Agent, or Firm—Louis Etlinger; Ronald Reichman

[57] ABSTRACT

A high speed, two dimensional phase gradient map of atmosphere-induced phase gradients measures the distortion of an optical beam transmitted through the atmosphere. This is accomplished by detecting phase gradients of an interference pattern produced by optically heterodyning a returned glint from a remote target with a portion of the transmitted beam. The phase gradients are utilized to assign conjugate corrective phase distortion values to COAT actuators to alter the phase structure of the waves at the transmitter aperture. In one embodiment, two interference patterns are formed with one pattern phase shifted by 90° with respect to the other. The phase gradients and their direction are detected as a function of position across the transmitter aperture by the use of two optical scanners driven in synchronism to scan the respective interference patterns. An electrical phase shifter is used in one channel along with sum and differencing units and an up-down counter to detect both the amplitude and direction of the phase gradients. This information is used to position wavefront correcting mirrors in the transmitter aperture to cancel out atmospheric distortion by properly predistorting the transmitted beam.

2 Claims, 5 Drawing Figures

NON-SEGMENTED PHASE GRADIENT DETECTOR FOR COAT SYSTEM

The United States Government has rights in this invention pursuant to Subcontract No. APL 6006.37 awarded by the Department of the Navy.

FIELD OF INVENTION

This invention relates to active optical systems and more particularly to an improved phase conjugate coherent optical adaptive techniques (COAT) system.

All types of systems which transmit a coherent optical beam through the earth's atmosphere suffer from distortion caused by the passage of the beam through the earth's atmosphere. More particularly, turbulence in the atmosphere distorts the wavefronts of the optical energy in the beam so that the wavefronts do not arrive at a remote location as parallel straight lines. This results in the power illuminating a given remote target being reduced and reduces the bandwidth of the signal channel if a modulated optical beam is utilized for optical communications.

In the past, there have been a number of COAT systems which utilize corrective optics for "predistorting" the wavefronts of the transmitted beam so as to compensate for the wavefront distortion caused by the travel of the beam through the atmosphere. In these systems, a part of the transmitted signal is reflected at a remote location either by a target or receiving apparatus. The reflection or glint returns energy which is distorted as it passes back through the atmosphere to the transmitting station. The phase conjugate of the distortion of the wavefronts of the returned radiation is the inverse of the distortion on the outgoing beam and may thus be used in cancelling out distortion. The phase distortion is measured by optically heterodyning the distorted glint or reflection with a locally generated beam so as to produce an interference pattern. Typically, the distortion of the wavefronts in the returned radiation is measured with a multiplicity of detectors in the transmitter aperture by measuring the position or phase of segments of the wavefronts as they exist at any given time across the transmitter aperture. This is called "subaperture" detection and in general, requires that the aperture field of view be divided up optically, with each optically subdivided portion of the interference pattern being focused onto a separate detector. It will be appreciated that this system detects phase at the points of detection and not phase "gradients".

What has been described is a conventional phase conjugate Coherent Optical Adaptive Techniques (COAT) system such as that described in an article entitled, "Active Optics: A New Technology for the Control of Light," John W. Hardy, in the Proceedings of the IEEE, Volume 66, No. 6, June, 1978, pp. 651-697. These types of systems are, in general active optical systems which are those in which real time control over optical wavefronts is employed to optimize system performance in the presence of random disturbances.

Prior to describing the subject invention, it should be noted that there is a class of COAT systems which utilizes a "multidither" technique. This technique alters the transmitted wavefronts through the use of individually controlled mirrors until energy returned from the target or receiving point is at a maximum. At this point, the servo system utilized positions the mirrors such that the return is kept at a maximum. The returned energy is maximized when the wavefronts have been properly predistorted for the particular atmospheric path through which the transmitted signal propagates. However, the corrective servo loops have a fairly long response time and may therefore, be inadequate for rapidly changing atmospheric conditions.

The subject invention utilizes the phase conjugate COAT concept, and rather than detecting the phase of the returned radiation at a number of points, directly measures the phase "gradient" of the returned radiation, including its direction. In one embodiment, this is accomplished by using optical scanning apparatus and specialized processing involving phase shifting, sum and differencing and an up-down counter. The particular phase correction signal to be applied to the wavefront error correction apparatus are then computed from the phase gradient measurements. When phase gradients are measured by the subject optical scanning apparatus, subaperture multi-detector systems need not be used. This eliminates the attendant difficulties of locating a plurality of detectors in the transmitter aperture and the utilization of subaperture focusing optics. As such, the subject system is characterized as "non-segmented".

It will be appreciated that the reflected glint produces spherical wavefronts which can be considered straight parallel lines at the transmitter aperture. In the subject invention, when these wavefronts have been distorted by passage through the atmosphere, they are optically heterodyned with a locally generated coherent beam at the same wavelength as the transmitted beam, such that two interference patterns are formed. These interference patterns are formed such that one is 90° out of phase with respect to the other. Each interference pattern is scanned by a different separate optical scanning device such as a vidicon camera, and the outputs are applied to a phase gradient detection circuit so that, once the phase gradients and its direction have been determined, phase correction can be applied to a wavefront error corrector.

The purpose of forming the two interference patterns is to provide information as to the direction of the phase gradient. However, the subject invention includes the concept of forming a single interference pattern and scanning it with an optical scanning device to detect phase gradients.

In one embodiment, the phase shifted interference patterns are produced by using two flat mirrors displaced by ⅛ wavelength. The interferometric patterns are detected by two synchronized video cameras, the output of one of which is 90° phase shifted. The output of the phase shifter and the output of the other camera are converted to sum and difference signals. The information in these signals is then digitized and provided to an up-down counter which detects the degree of phase shift in terms of the phase gradient between two adjacent points on a scan line. This system also automatically determines the direction of the phase gradient depending on whether the count increases or decreases. The output of the up-down counter is treated as an error signal indicating the change is phase between two adjacent locations on a scan line. This information is fed to a processor which converts the phase "gradient" information into mechanical actuation signals for the active elements in the wavefront error corrector. The wavefront error corrector may be of either the segmented mirror type, the discrete position actuator type, the discrete force actuator type, the continuous thin plate mirror type, the monolithic mirror type, or the membrane mirror type.

In another embodiment, a small corner reflector is provided at the target or receiving site to enhance the returned radiation and this increases the signal-to-noise ratio of the system.

It is therefore an object of this invention to provide phase gradient detection for phase conjugate wavefront correction in a COAT system;

It is another object of this invention to provide a method and apparatus for ascertaining phase distortion in optical signals passing through the atmosphere in which phase gradients are measured and phase correction are signals generated for use with a wavefront error corrector employed to predistort a transmitted signal;

It is another object of this invention to provide phase gradient scanning apparatus for detecting phase distortions in a phase conjugate COAT system in which sub-aperture phase detection or aperture dividing optics and detectors are eliminated in favor of optical scanning apparatus;

It is another object of this invention to provide a phase gradient detector utilizing phase shifted interference patterns, electrically phase shifted signals, sum and difference processing, analog-to-digital converters, and an up-down counter to ascertain the direction as well as the magnitude of the phase gradient;

It is another object of this invention to provide a COAT system with an atmospheric distortion detector in which two interferometric images are produced, which are phase shifted 90° one from the other so as to be able to ascertain not only the degree of the phase shift but also the direction of the phase shift;

It is another object of this invention to provide an improved phase conjugate COAT system utilizing a small cube corner reflector to produce the glint necessary for ascertaining the phase distortion in a beam which passes through the atmosphere.

These and other objects of the invention will be better understood in view of the following description taken in conjunction with the drawings in which:

DETAILED DESCRIPTION

As mentioned hereinbefore, one of the problems encountered in coherent optical adaptive technique (COAT) systems is that of measuring the phase perturbations introduced by the atmosphere over a transmitter aperture. The subject measurement technique, in effect, produces a two dimensional map of atmosphere induced phase gradients in the transmitter aperture in order to assign the conjugate corrective phase distortion values to the COAT actuators in the wavefront error correctors, which alter the phase structure of the waves at the transmitter aperture.

Figure 1:
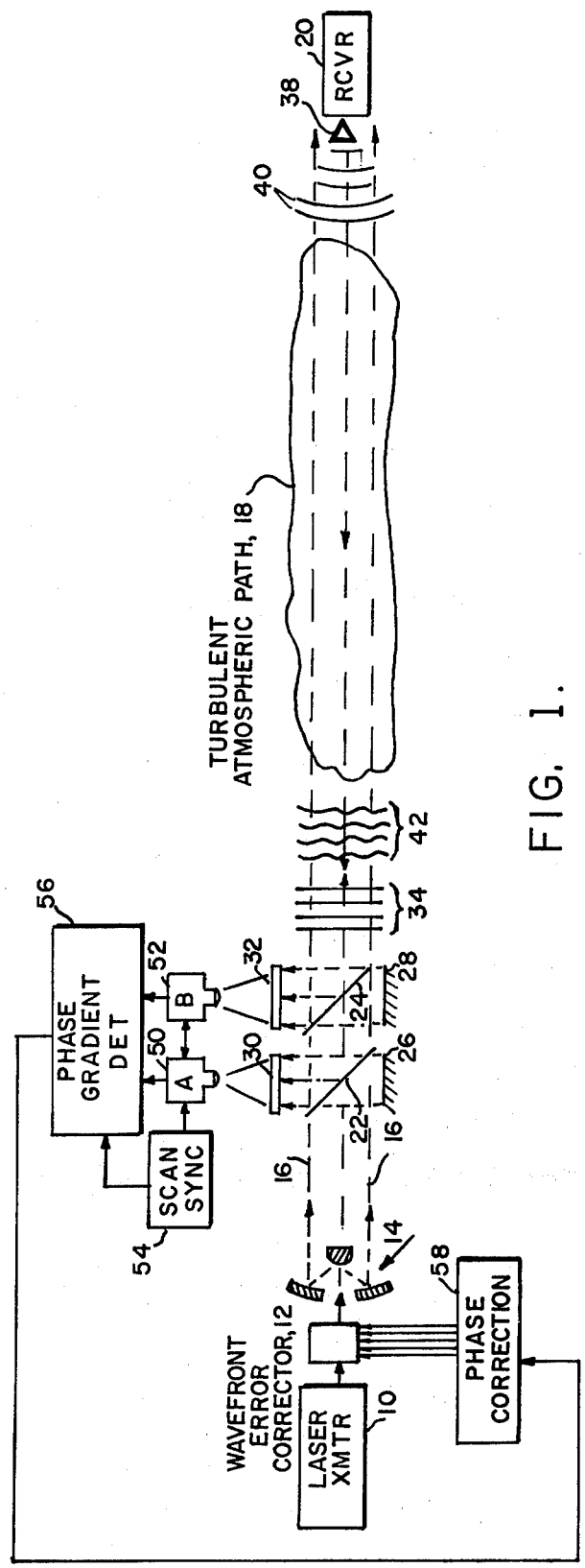
FIG. 1 is a block diagram illustrating an improved phase conjugate COAT system.

In the subject invention, a system is described for producing a high speed phase gradient map of the transmitter aperture. Referring to FIG. 1, a laser transmitter 10, which may or may not be modulated, has its output coupled through a wavefront error corrector 12 which is conventional in design and which, in one embodiment, may include individually actuated mirrors which adjust the phase of the outgoing beam across the extent of the transmitter aperture. These devices, in general, correct or control the phase of a wavefront either by changing the velocity of propagation or by changing the optical path length. The former is achieved by varying the refractive index of a medium (cf. a Bragg Cell), while the latter is implemented by moving a reflective surface such as a mirror. However, reflective type wavefront correctors are usually desired in view of the fact that the wavefront corrections produced by Bragg cells are chromatic in that the phase shift angle remains constant with optical wavelength and the tilt angle is proportional to wavelength. For many optic applications, it is necessary to correct path length and tilt error that are wavelength independent. Bragg cells may be achromatized by the use of additional cells in the optical path. A further disadvantage of Bragg cells is that each cell can make only one discrete adjustment of phase or tilt so that a spatial array of cells is required to correct an optical aperture.

Most of these problems are avoided with reflecting type wavefront correctors. Because the optical path is confined to one side of the mirror surface, a great variety of substrate materials and methods of deforming the mirror are available. It will be appreciated that the wavefront deformation is a true optical path length change, independent of wavelength.

The types of reflective wavefront correctors fall into the following two categories: segmented mirrors and continuous thin-plate mirrors. Segmented mirrors involve either the utilization of pistons only, or piston plus tilt type actuators. As to the continuous thin-plate mirrors, they may be in the form of discrete position actuators, discrete force actuators, bending moment actuators, monolithic mirrors, or membrane or pellicle mirrors. One successful type of thin-plate active mirror was built by the Perkin Elmer Corporation for NASA and is a 76 centimeter diameter mirror with 61 actuators. Another type device which is currently available is the monolithic piezoelectric mirror which is a type of monolithic active mirror. This device is available from Itek Corporation and utilizes a circular slab of lead zirconate titanate piezoelectric ceramic to which are applied an array of electrodes at the top surface. A thin glass plate is bonded to the top surface and is optically polished and aluminized to form the reflecting surface. When this type of device is actuated, it has the following characteristics. When voltages are applied to the electrodes, the piezoelectric deformation all occurs close to the top surface and no deformation occurs at the base. The induced deformations are localized in the vicinity of the activated electrode. The coupling between neighboring electrodes can be adjusted from zero to at least 20% by varying the geometry of the electrodes. Finally, there is no measurable bending of the block when voltages are applied to the electrode.

Having phase adjusted the optical output of the laser transmitter, this beam is focused by a typical Cassegrain system 14 which forms a beam 16 as indicated which travels over an atmospheric path 18 to a remote location at which may be located a receiver 20. The beam first passes through a pair of beam splitting devices 22 and 24 which couples out portions of the beam. Flat mirrors 26 and 28 are utilized in producing the interference patterns utilized to detect the phase gradient distortion introduced by the atmosphere.

Flat mirrors 26 and 28 are displaced by ⅛ wavelength such that a 90° phase shift is introduced. Interference patterns are formed at optical filtering and field lens apparatus 30 and 32.

A corner reflector 38 at receiver 20 reflects back approximately 1/100 of the radiation impinging on the receiver and, as such, enhances the glint which would normally be received from a distant target. The corner reflector, in essence, produces spherical waves 40 which transmit back through the atmosphere and are distorted as illustrated by the waves 42. These distorted wavefronts are reflected by mirrors 24 and 22 to the respective optical filter and field lens apparatus at which the above-mentioned two interference patterns are formed. Note that the system illustrated is a pulsed system. In this system the wavefront error corrector is returned to its neutral position prior to transmitting each laser pulse so that the interference patterns are produced with unpredistorted light. Alternatively, a portion of the laser output can be picked off prior to wavefront error correction to provide a continuously available local source for interference pattern generation.

In either case, the optical filter and field lens apparatus are scanned in parallel by image dissector scanning devices which form two channels of information here labeled "A" and "B". These image dissecting cameras are illustrated by reference characters 50 and 52 and are maintained in scanning sync via unit 54. The output of these cameras is applied to a specialized phase gradient detector 56 which determines not only the magnitude of any phase distortion on a point-by-point basis, but also ascertains the direction of the local phase gradient.

Figure 2:
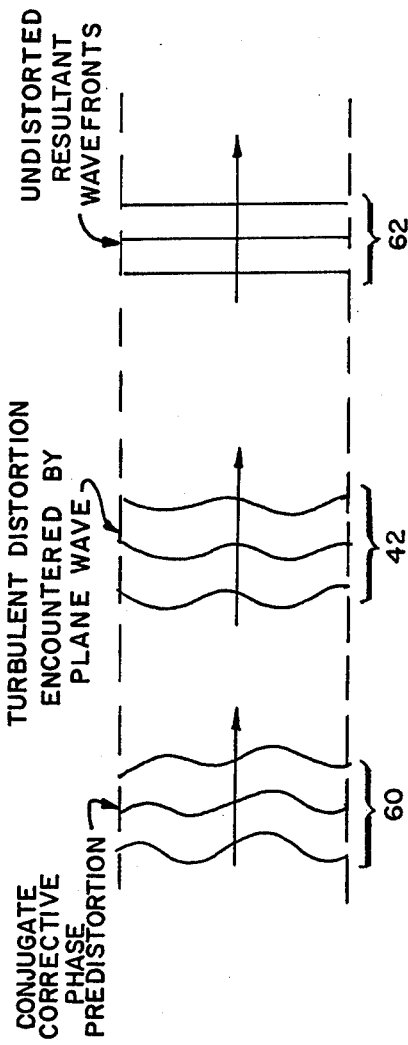
FIG. 2 is a diagrammatic illustration of phase conjugate predistortion which cancels random distortion caused by the passage of an optical beam through the atmosphere to provide an undisturbed and undistorted resultant wave at a remote point.

Once having ascertained the phase gradient at known points along scan lines across the transmitter aperture, it is a simple matter to obtain actuator signals for the mirrors in the wavefront error corrector in accordance with the magnitude of the phase gradient and its sign. This is accomplished by phase correction unit 58 in accordance with the following formula:

Phase Correction in Wavelengths $$\lambda(x) = -C_n - (x - x_n)(C_{n+1} - C_n)/(x_{n+1} - x_n)$$

where: x is the location of a corrective actuator centroid; $x_n$ is the location of the last count before x; $x_{n+1}$ is the location of the first count beyond x; $C_n$ is the last count before x; and $C_{n+1}$ is the first count beyond x. Note: $(C_{n+1} - C_n) = \pm 1$ Referring to FIG. 2, assuming that the distortion over the atmospheric path results in wavefronts 42, by predistorting the output from the laser transmitter as illustrated by the conjugate corrective phase predistortion 60, it is possible to cancel out the effects of atmospheric distortion on the transmitted beam thereby to produce undistorted resultant wavefronts 62 at a remote location such as that illustrated by receiver 20 in FIG. 1.

There are two advantages to the conjugate phase correction introduced by this system. The first is that a maximum amount of power is concentrated at the remote location. Thus, when the laser transmitting apparatus is utilized, for instance, as a laser radar, the amount of energy on target is maximized. When the laser transmitter is utilized to transmit intelligence to a remote location, the bandwidth of the system is greatly increased due to the coherent wavefront structure which impinges upon the receiver. By predistorting the transmitter's output, atmospheric turbulence which distorts the wavefronts in a transmitted beam is cancelled. Therefore, the intelligence may be transmitted to the receiving site in a coherent fashion.

It will be appreciated that when a small cube corner reflector is utilized to return energy back to the transmitter site, the corner cube is too small to be optically resolvable at the transmitter and acts as a point source. The wavefronts returning from the corner cube accumulate to record phase distortion present along the turbulent optical path. The returned waves impinge upon beam splitters which redirect the returned wave onto a pair of field lenses (A and B). The beam splitter also picks off part of the outgoing plane wave energy from the transmitter. This is reflected by a pair of flat mirrors onto the fronts of the field lenses. Here the transmitter energy acts as a phase reference which produces interference bands as it interferes constructively and destructively with the returned energy from the corner cube. The resulting interference bands form a two-dimensional contour map of the phase perturbations in the transmitter aperture resulting from atmospheric path turbulence. The information contained in the two-dimensional contour map is then serialized by scanning it with a high-speed video camera such as an image detector camera. This enables the system to measure the altitudes of the hills and valleys of the phase perturbations by counting contour lines as a measure of wavelengths and perturbations.

Figure 4:
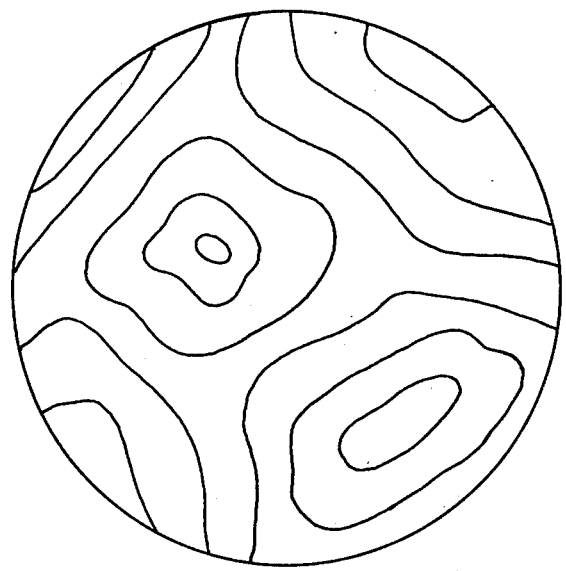
FIG. 4 is an interference pattern produced by a typical phase conjugate COAT system.
Figure 5:
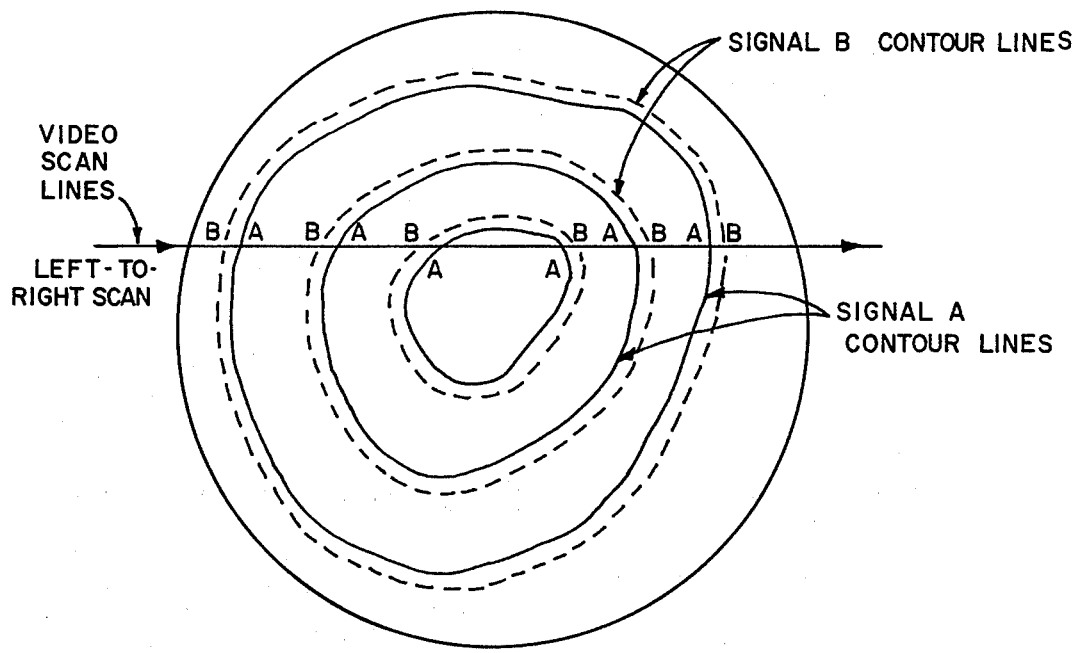
FIG. 5 is a diagrammatic representation of a scan line superimposed over the interference patterns formed for a dual channel system in which one of the interference patterns is phase shifted by 90° thereby to permit the ascertaining of the direction of the phase gradient.

A single video scanner cannot determine whether it is counting uphill or downhill on the isophasic contours. This is remedied by using the two aforementioned video channels. The phase reference for camera 52 is shifted 90° with respect to the phase reference for camera 50 by introducing a differential ⅛ wave displacement in flat mirror 30. A typical phase perturbation contour map showing the instantaneous phase contours is shown in FIG. 4. Examination of this figure cannot reveal whether adjacent contour steps are increasing or decreasing in phase. If 90° phase is added, the phase shifted contour map of FIG. 5 results, with the 90° phase shifted contours shown by the dashed lines. For clarity, FIG. 5 shows a magnified section of FIG. 4. Basically, the interference bands seen by camera 50 and camera 52 are superimposed. A scanning line is produced by the video cameras as shown in FIG. 5. It will be appreciated that it is now possible to ascertain whether the scanners are scanning uphill or downhill by noting the sequence in which signals from cameras 50 and 52 peak.

Figure 3:
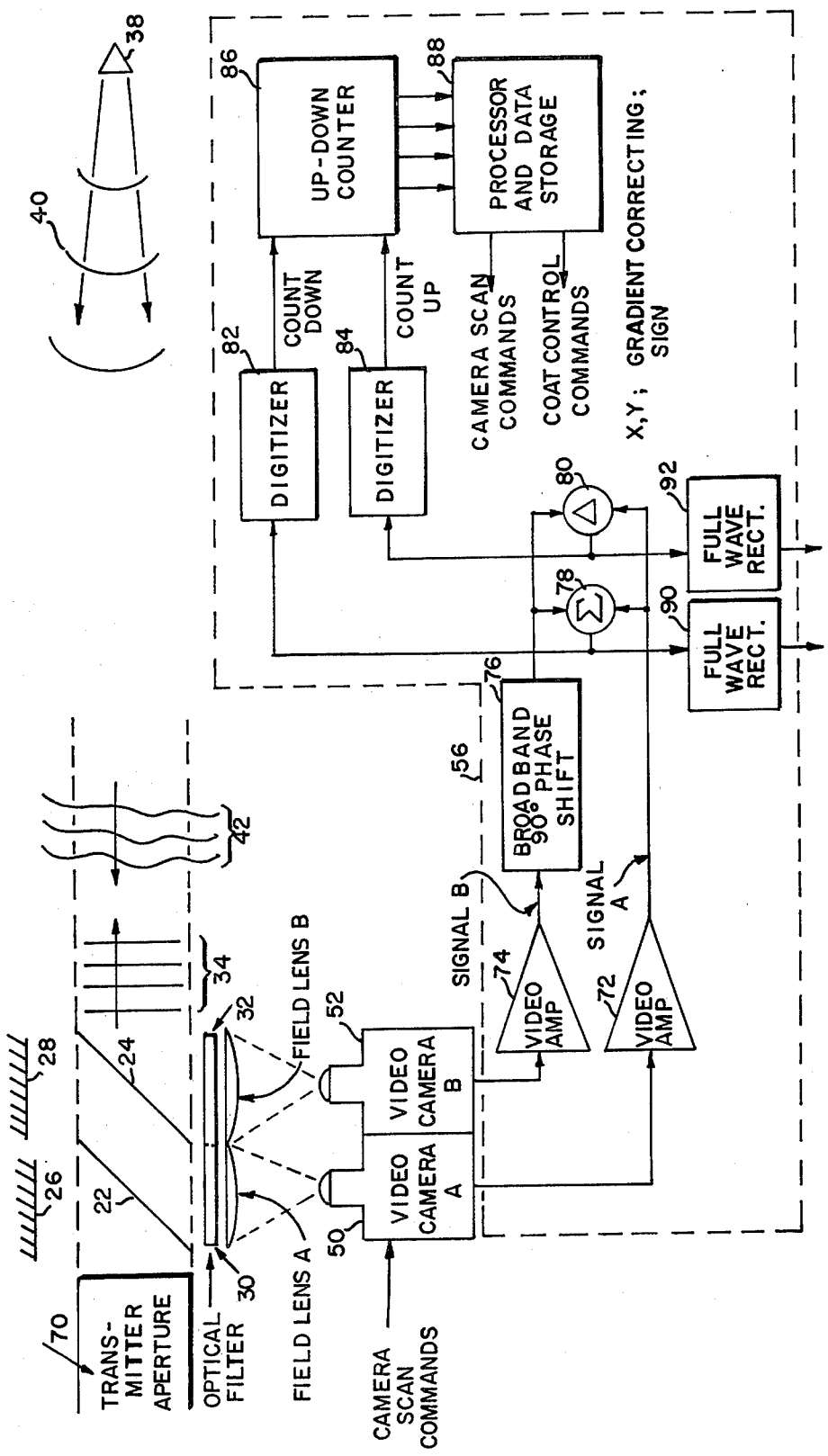
FIG. 3 is an expanded block diagram of the system illustrated in FIG. 1 illustrating in detail the phase gradient detection portion of the subject system.

Before continuing further with the description of the operation of the subject invention, and referring now to FIG. 3, it will be noted that like apparatus in FIGS. 1 and 3 carry like reference characters. In this figure, the transmitter aperture is designated by reference character 70 and the phase gradient detector is illustrated in dotted box 56. It will be appreciated that the signals from video cameras 50 and 52 are amplified respectively by video amplifiers 72 and 74 with the A and B signals as noted. It will be appreciated that the output of the video amplifier 74 is broadband phase shifted by 90° via conventional phase shifter 76. The output of the broadband phase shifter and video amplifier 72 are coupled to a summer 78 and a differencer 80. The outputs of summer and differencer are digitized by conventional digitizers 82 and 84 and are applied respectively to the count-down and count-up input to a conventional up-down counter 86. The outputs of the up-down counter are provided to a processor and data storage unit 88 which produces camera scan commands and COAT control commands. It will be appreciated that the output of the up-down counter not only provides information as to the magnitude of the phase gradient, but also its direction as well. As can be seen, the outputs of the summer and differencer may be applied to full wave rectifiers 90 and 92 if a graphic display of the outputs of the sum and difference channels is desired.

In operation, scanning from left to right in FIG. 5 and assuming that the scan begins uphill with the sequence of contour peaks as BA, electrically, this shows up as channel B video leading channel A in phase by 90°. As the scan proceeds through the maximum phase excursion and starts downhill, the sequence of contour peaks reverses, namely AB, or in electrical terms, the channel A video leads the channel B video in phase by 90°. This reversal of phase sequence makes it possible to electrically separate the uphill and downhill phase contour signals. The separation procedure is rather simple, consisting of introducing a broadband 90° electrical phase shift in channel B, then summing and differencing the A and B signals. On an uphill count, video amplifier B output leads amplifier A by 90°.

As can be seen, an extra 90° phase shift is added to signal B which causes it to be 180° out of phase with signal A. The output of the summer is therefore 0 (equal amplitude A and B signals cancel) when scanning uphill. The output of the differencer is then twice the amplitude of the individual video channels, thus the uphill scanning signal appears only at the differencer output. In like manner, when scanning downhill, the signal at the differencer disappears and appears only at the summer output.

The sum and difference channels are digitized and fed respectively to the up and down count input of the up-down counter. The up-down counter then integrates the phase excursions over the scanned aperture with reference to the starting point in the scan. Furthermore, by full wave rectification of the sum and difference outputs, phase contours can be recorded in increments of ½ wave. Even finer interpolation is possible using high speed A/D converters and processing logic.

The optical phase gradient scanner is, therefore, capable of sequentially reading out phase perturbation values within a transmitter aperture referenced to any convenient starting point. The readouts can be programmed to occur at those locations which correspond to the centroids of individual "actuators" located within the transmitter aperture. The raster would, therefore, follow a path connecting the centroids of the COAT elements. As the scan crosses each actuator centroid location, the contents of the up-down counter and interpolation circuits can be read out, converted to the conjugate value and used to command the COAT actuator to the proper error cancelling conjugate phase position. This is a high speed process capable of utilizing the full bandwidth of the COAT actuator by eliminating servo loops around long path delays. Also eliminated is the use of multiple dither rates, degradation of performance due to dither, and the limitation on the number of COAT elements because of dither signal sorting problems and degradation of the signal-to-noise ratio per dither channel as a number of actuators becomes large. Since the actual phase perturbations are measured, there is no problem with the $2N\pi$ ambiguities that can occur in some multi-dither COAT systems. The use of extra actuators and their attendant optical losses for the purpose of introducing dither is eliminated.

The use of the optical phase gradient phase scanner makes possible the expansion of the number of COAT actuators in the COAT array such that a higher degree of correction is made possible at greater ranges. The system also does not require a lengthy "hunt" and "lock" on as required on certain other COAT systems.

Although preferred embodiments of the invention have been described in considerable detail for illustrative purposes, many modifications will occur to those skilled in the art. It is, therefore, desired that the protection afforded by Letters Patent be limited only by the true scope of the appended claims.

I claim:

1. Apparatus for the detection of wavefront distortion in a transmitted coherent beam propagating through the atmosphere from a transmitting site to a remote location comprising:

means at said remote location for returning a part of the incident energy back to the transmitting site over the same path through the atmosphere as the transmitted beam;

means for optically heterodyning said returned energy with a coherent beam of the same optical frequency as that of said transmitted beam so as to produce an interference pattern; and means for optically measuring the phase gradients of said returned energy in terms of the interference fringes of said interference pattern, wherein said measuring means further comprises means for producing an interference pattern which includes means for producing two such patterns with one pattern phase shifted by 90° with respect to the other and wherein said optical measuring means includes two such devices, each for scanning a different interference pattern, and means for synchronizing the scans of said two devices.

2. The apparatus of claim 1 wherein said measuring means includes means for electrically phase shifting the output signal from one of said scanning means, means for obtaining sum and difference signals based on the output signals from the electrically phase shifted output of said one scanning means and the output of the other scanning means, means for converting the sum and difference signals to digital quantities and an up-down counter having its up-down inputs respectively coupled to the digitized sum and difference signals.

* * * * *